United States Patent [19]

Bonis

[11] 4,440,824

[45] Apr. 3, 1984

[54] THERMOFORMABLE COEXTRUDED MULTILAYERED STRUCTURE

[75] Inventor: Laszlo J. Bonis, Swampscott, Mass.

[73] Assignee: Composite Container Corporation, Medford, Mass.

[21] Appl. No.: 432,421

[22] Filed: Oct. 4, 1982

Related U.S. Application Data

[63] Continuation-in-part of Ser. No. 314,118, Oct. 23, 1981, abandoned.

[51] Int. Cl.³ .......................... B65D 5/64; B32B 27/08
[52] U.S. Cl. ...................................... 428/216; 428/35; 428/349; 428/516; 428/517; 428/520; 264/515; 264/176 R
[58] Field of Search ................................ 428/349, 216

[56] References Cited

U.S. PATENT DOCUMENTS

| | | | |
|---|---|---|---|
| 3,589,976 | 6/1971 | Erb | 156/244 |
| 4,101,047 | 7/1978 | Geppert et al. | 220/258 |
| 4,101,050 | 7/1978 | Buckler et al. | 428/517 X |
| 4,183,435 | 1/1980 | Thompson et al. | 428/322 X |
| 4,234,663 | 11/1980 | Catte' et al. | 428/517 |
| 4,292,355 | 9/1981 | Bonis | 428/517 X |

OTHER PUBLICATIONS

"Polyethylene-high impact polystyrene laminate", Research Disclosure, Dec. 1979, No. 18818, p. 670.
"Market Potential For Coextrudable Adhesives", David P. Dumbleton, pp. 55, 57–64.
"Du Pont CXA 1123 & 1124".
"CXA Coextrudable Adhesives For Coextrusion Coating and Laminating", P. S. Blatz, E. I. DuPont de Nemours & Co., Inc., Nov. 4, 1981, pp. 2–11+.

Primary Examiner—P. Ives

[57] ABSTRACT

A multilayer thermoplastic sheet suitable for thermoforming into containers, the sheet being simply and expeditiously prepared and provided with consistent and reliable bonds between layers in a single process step by coextruding a polyolefin having moisture barrier properties with a high impact polystyrene layer, to provide heat sealability, a printable surface, and quick and inexpensive thermoforming for the multilayer sheet.

12 Claims, 3 Drawing Figures

THERMOFORMABLE COEXTRUDED MULTILAYERED STRUCTURE

This application is a continuation-in-part of Ser. No. 314,118, filed Oct. 23, 1981, now abandoned.

FIELD OF THE INVENTION

The invention relates to coextruded sheets and containers made from them.

BACKGROUND OF THE INVENTION

Polyolefins with moisture barrier properties such as polypropylene and polyethylene have been used to form containers; however, thermoforming of polyolefins is very slow, and therefore expensive, and polyolefins do not provide good printing on their surfaces or heat sealing, Polystyrene, on the other hand, has no barrier properties, can be quickly thermoformed, and can be heat sealed, and polystyrene surfaces can be printed on directly.

SUMMARY OF THE INVENTION

It has been discovered that by coextruding high impact polystyrene with a polyolefin having moisture barrier properties and an adhesive tie layer, a useful multilayered sheet results. The polyolefin layer is greater than 2 mils thick to provide a good moisture barrier, and the content of polyolefin layer in the structure is less than 33% to facilitate thermoforming and trimming. In addition to a moisture barrier, the sheet has a printable surface, permits heat sealing, and can be thermoformed at the same rate that polystyrene alone is thermoformed, which rate is much faster than that for a polyolefin alone. By coextrusion of the materials, a multilayered sheet with high quality bonds between the layers in terms of consistency and reliability is simply and expeditiously provided in a single process step without having to laminate a plurality of different layers together.

In preferred embodiments, the polystyrene is a mixture of crystal polystyrene and a radial butadiene/styrene teleblock copolymer to provide both increased impact resistance and clarity to the structure; the polyolefin is polypropylene; additional polystyrene and adhesive tie layers are on the other side of the polyolefin layer to result in a five-layer structure that has resistance to curling owing to the symmetrical structure, and permits heat sealing and/or printing on both of the outer surfaces; the polyolefin layer is 2-15 mils thick (most preferably 2-5 mils thick), and the polystryene layer is greater than or equal to 5 mils thick; and the adhesive tie layer is made of one of the adhesive materials specified herein.

DESCRIPTION OF THE PREFERRED EMBODIMENT

The structure and manufacture of the presently preferred embodiment of the invention will now be described after first briefly describing the drawings.

Drawings

STRUCTURE

Turning to the figures, there is shown container 10 in which food (e.g., a ready-prepared stew) has been packed. The container consists of bowl 14 and lid 16.

Figure 3:
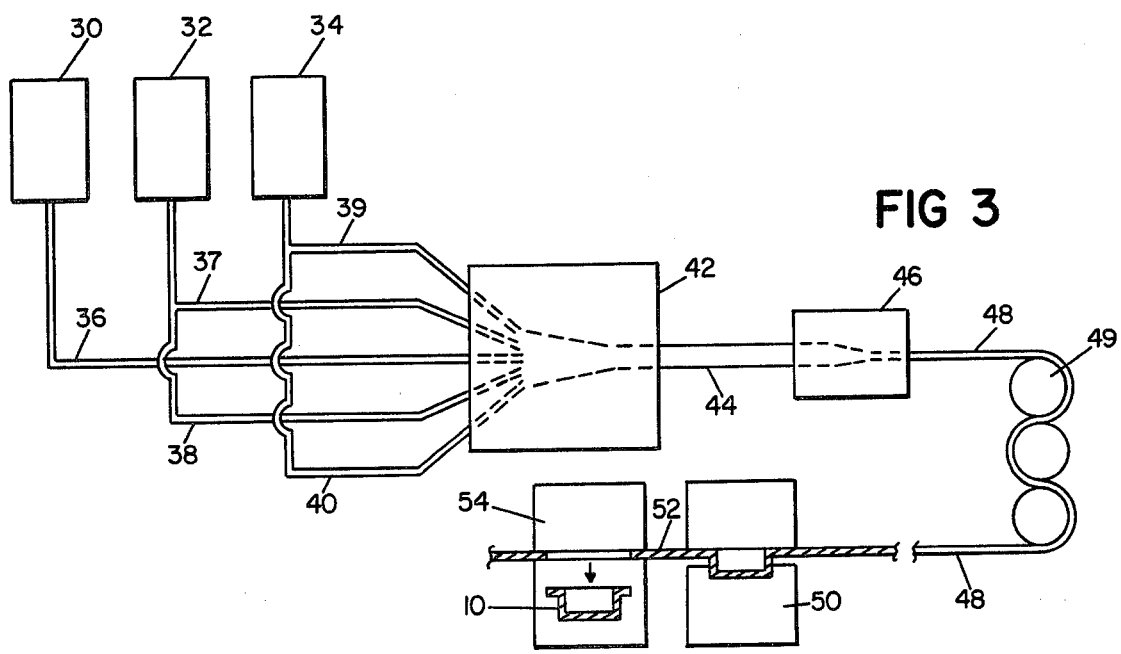
FIG. 3 is a diagrammatical view of the manufacturing process for forming the FIG. 1 container.

Both the lid and bowl are made from multilayer sheets that are formed by coextrusion. Bowl 14 is thermoformed from such a sheet, as depicted in FIG. 3. Lid 16 is cut from a similar sheet and heat sealed to rim 20 of the bowl.

Figure 2:
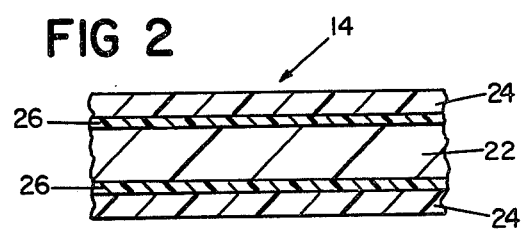
FIG. 2 is a cross-sectional view, taken at 2—2 of FIG. 1, showing the multilayer structure of the container.

As shown in FIG. 2, the finished bowl and lid have five layers.

Referring to FIG. 2 there is shown a portion of the wall of bowl 14. It has central layer 22 made of polypropylene (available from Rexene Company, Paramus, N.J. and having an $H_2O$ permeability at 100° F., a 90% humidity of less than about 1.0 gm/mil/100 $in^2$-24 hr and a melt flow index of 4 decigrams/min), outer layers 24 of polystyrene (70% crystal styrene and 30% rubber modifying plastomer sold by Phillips Chemical Company under the trade designation Solprene 416P, a block polymer having a butadiene/styrene ratio of 70/30, a molecular weight of 140 M, a density of 0.94, and a melt flow index of 2 decigrams/min), and two intermediate adhesive tie layers 26 made of the above described rubber modifying plastomer. In thermoformed container 10, polypropylene layer 22 is 10 mils thick, outer polystyrene layers 24 are each 3 mils thick, and intermediate adhasive tie layers 26 are each ½ mil thick, resulting in a 17 mil thick wall.

Container 10 has a moisture barrier provided by polypropylene layer 22 and printable surfaces provided by outer polystyrene layers 24, and bowl 14 can be heat sealed to lid 16 owing to polystryene layers 24. The radial butadiene/styrene teleblock copolymer not only provides impact resistance to the otherwise brittle crystal polystyrene, but does so while retaining the clarity of the material. (Other high impact polystyrenes made with polybutadiene rubber as the impact modifiers are generally opaque.) The symmetrical nature of the five-layer wall structure provides resistance to curling.

MANUFACTURE

Referring to FIG. 3, the coextrusion process for forming the five-layer sheet for container 10 is shown. Three heated containers 30, 32, and 34, serve as sources of polypropylene, adhesive tie layer, and high impact polystyrene, respectively. Five conduits 36, 37, 38, 39, 40, supply the heated materials to coextrusion block 42. The materials in containers 32, 34 are kept below 380° F. to avoid cross-linking and gelating. There the materials merge together to form under pressure a unitary, five-layer thick stream 44 of generally circular cross-section. The middle layer is made of the polypropylene, the outer layers are made of high-impact polystyrene, and the intermediate layers are made of the adhesive tie layer material. Stream 44 passes into extrusion die 46 (e.g., Welex standard 54" flex-lip) and is extruded into continuous sheet 48, about 34 mils thick. Sheet 48 then passes through a series of chill rolls 49. The sheet may then be processed into containers, or wound into spools (not shown) for storage.

To process sheet 48 into containers, the sheet is passed through conventional thermoforming apparatus 50 (the vacuum forming type well-known in the art), which impresses the container shape and in so doing reduces the wall thickness by about 50% on the average, making the finished container wall about 17 mils thick. The thickness of individual layers are also reduced by about 50% during thermoforming. It has been found that thermoforming of sheet 48 proceeds quickly at the same rate that thermoforming of styrene alone proceeds. This is much faster than the slow, and therefore expensive, thermoforming of polypropylene alone.

Figure 1:
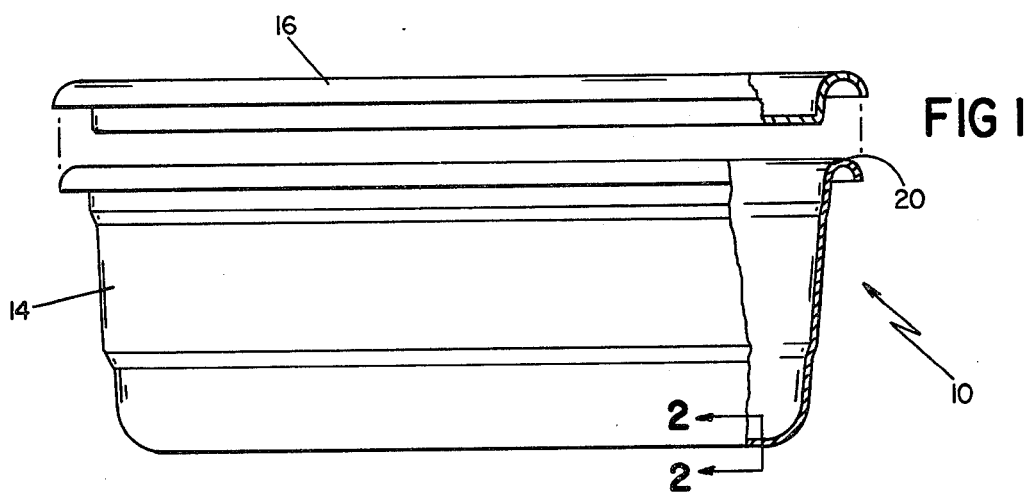
FIG. 1 is an elevation, partially broken away, of a container according to the invention.

After thermoforming, the shaped sheet 52 passes through trim press 54, in which the individual bowls 14 for the containers are separated. Thereafter, each bowl is given curled rim 20 (FIG. 1) by a conventional curling machine (not shown).

Lids 16 are separately cut from sheet 48 and heat-sealed to curled rim 20 by conventional heat-sealing techniques.

By this method of manufacture, a complex multilayered sheet is simply and expeditiously prepared from three sources of material by a single coextrusion process, and there is no need for laminating a large number of different layers or multilayered sheets together.

OTHER EMBODIMENTS

A most preferred structure for sheet 14 is outer 5 mil thick layers 24 of the same material described above for layers 24, inner 5 mil thick layer 22 of polypropylene, and 1 mil thick adhesive tie layers 26 of ethylene-vinyl acetate copolymer (available from DuPont under the trade designation ELVAX 3190 and having a melt flow index of 2 decigrams/min, a vinyl acetate content of 25%, and a density of 0.95). In manufacture, the materials in container 32, 34 are kept below 425° F. to avoid cross-linking and gelating. Such a structure provides a very good moisture barrier (better than 0.1 cc/100 in$^2$-24 hr). Also, by having less than 33% polypropylene, theroforming is facilitated by avoiding shrinkage, and difficulty in trimming associated with larger amounts of polypropylene is avoided.

Other embodiments of the invention are also within the scope of the appended claims. For example, so long as the polyolefin layer is greater than or equal to 2 mils thick, the coextruded structure provides an adequate moisture barrier generally free of voids in the layer, and the proportion of high impact polystyrene in the structure can be increased even higher than about 67%. Also, other high impact styrenes will work when clarity is not necessary, and other adhesives will work, examples being ethylene-vinyl acetate copolymer, ethylene-vinyl acetate copolymer with 3–10% (most preferably 5%) acrylic acid additive (available from Dow Chemical, technical grade), butadiene/styrene copolymer having endblocks of polystyrene and rubber midblocks of butadiene (available from Shell under the trade designation Kraton 1102 or 2103 and having 27.4 to 29.4% butadiene; a melt flow index of 15 decigrams/min and a density of 0.94), butadiene/styrene copolymer having endblocks of polystyrene and rubber midblocks of polyolefin (available from Shell under the trade designation Kraton G and having a melt flow index of 15 decigrams/min and a density of 0.91), and polyolefin (most preferably polyproylene) with acrylic acid additive (most preferably 3–10%). Preferably the vinyl acetate content of the ethylene-vinyl acetate copolymer adhesives is 12–28% (most preferably 21–26%). Preferably the polyolefin layer is 2–15 mils thick (most preferably 2–5 mils thick) and preferably the polystyrene layer is greater than or equal to 5 mils thick. Preferably the high impact polystyrenehas 25–35% radial butadiene styrene teleblock copolymer and about 75–65% crystal styrene (most preferably 30% radial butadiene/styrene teleblock copolymer and about 70% crystal styrene.)

Also, other polyolefins with moisture barrier properties such as polyethylene can be used in place of polypropylene, and the polyolefin or adhesive layer can include up to 5% fatty acid clarifier additive (available from Miliken under the trade designation 1023).

What is claimed is:

1. A coextruded multilayered structure comprising
   a layer of a polyolefin of the group of polyethylene and polypropylene, to provide effective moisture barrier properties,
   a layer of high impact polystyrene,
      said polystyrene layer providing a printable and heat sealable surface and thermoformability during manufacture, and
   an adhesive tie layer between said polystyrene and polyolefin layers,
      said tie layer consisting essentially of one of the group of ethylene-vinyl acetate copolymer and polyolefin with acrylic acid additive.

2. The structure of claim 1 wherein said polystyrene layer is made of a mixture of polystyrene and a rubber modifying plastomer.

3. The structure of claim 2 further comprising an adhesive tie layer and a polystyrene layer bonded to the other side of said polyolefin layer to result in a five-layer structure that has resistance to curling owing to the symmetrical structure.

4. The structure of claim 2 wherein said rubber modifying plastomer comprises radial butadiene/styrene teleblock copolymer to increase impact resistance and provide clarity for the structure.

5. The structure of claim 4 wherein there is 25–35% radial butadiene/styrene teleblock copolymer and about 65–75% crystal styrene in the polystyrene layer.

6. The structure of claim 1 wherein said adhesive tie layer includes ethylene-vinyl acetate copolymer with 12–28% vinyl acetate content.

7. The structure of claim 6 wherein said vinyl acetate content is 21–26%.

8. The structure of claim 1 wherein said layer of polyolefin is 2 to 15 mils thick.

9. The structure of claim 8 wherein said layer of polyolefin is 2 to 5 mils thick and said layer of high impact polystyrene is greater than or equal to 5 mils thick.

10. The structure of claim 1 wherein said polyolefin is polypropylene.

11. The structure of claim 1 wherein said polyolefin layer contains up to 5% fatty acid additive to provide clarity.

12. A composite thermoformed from a coextruded multilayered sheet comprising
   a layer of a polyolefin of the group of polyethylene and polypropylene to provide effective moisture barrier properties,
   a layer of high impact polystyrene,
      said polystyrene layer providing a printable and heat sealable surface and thermoformability during manufacture, and
   an adhesive tie layer between said polystyrene and polyolefin layers,
      said tie layer consisting essentially of one of the group of ethylene-vinyl acetate copolymer and polyolefin with acrylic acid additive.

* * * * *